("12") United States Patent
Lobell et al.

(10) Patent No.: US 9,902,478 B2
(45) Date of Patent: Feb. 27, 2018

(54) POD PROPULSION DEVICE AND A METHOD FOR COOLING SUCH

(71) Applicant: ROLLS-ROYCE AKTIEBOLAG, Kristinehamn (SE)

(72) Inventors: Anders Lobell, Karlskoga (SE); Daniel Ahl, Karlstad (SE)

(73) Assignee: Rolls-Royce Aktiebolag (SE)

( * ) Notice: Subject to any disclaimer, the term of this patent is extended or adjusted under 35 U.S.C. 154(b) by 0 days.

(21) Appl. No.: 15/314,904

(22) PCT Filed: May 4, 2015

(86) PCT No.: PCT/EP2015/059680
§ 371 (c)(1),
(2) Date: Nov. 29, 2016

(87) PCT Pub. No.: WO2015/185305
PCT Pub. Date: Dec. 10, 2015

(65) Prior Publication Data
US 2017/0158298 A1 Jun. 8, 2017

(30) Foreign Application Priority Data
Jun. 3, 2014 (SE) .................................. 1450675-2

(51) Int. Cl.
B63H 5/125 (2006.01)
H02K 9/10 (2006.01)
(Continued)

(52) U.S. Cl.
CPC .............. B63H 5/125 (2013.01); H02K 1/20 (2013.01); H02K 9/10 (2013.01); H02K 9/20 (2013.01);
(Continued)

(58) Field of Classification Search
CPC B63H 2005/1258; B63H 5/125; B63H 23/24; B63H 21/17; B63J 2/06;
(Continued)

(56) References Cited

U.S. PATENT DOCUMENTS 5,403,216 A 4/1995 Salmi et al.
6,312,298 B1 11/2001 Schuring
(Continued)

FOREIGN PATENT DOCUMENTS

EP 3 590 867 A1 4/1994
EP 1 010 614 A1 6/2000
(Continued)

OTHER PUBLICATIONS

International Search Report issued in International Application No. PCT/EP2015/059680 dated Sep. 1, 2015.
(Continued)

Primary Examiner — Lars A Olson
(74) Attorney, Agent, or Firm — Eric L. Sophir; Dentons US LLP

(57) ABSTRACT

The invention relates to a system and method for cooling of a pod propulsion device, including a motor casing (3) and a strut (2), which strut (2) is connected at a lower part thereof to the motor casing (3) and is arranged to be connected at an upper part thereof to a hull (1) of a ship, said motor casing (3) including a housing (6) enclosing an electric motor (5) with a stator (51) and a rotor, wherein periodically a forced cooling air flow (W,S) is shifted to use a front duct (2A) as supply (S) for limited time period TF and thereafter shift to use the aft duct (2B) as supply (S) for a limited time period TA. The invention also relates to a ship provided with such a system and method for cooling of pod propulsion device.

16 Claims, 3 Drawing Sheets

(51) Int. Cl.
  *B63H 23/24* (2006.01)
  *H02K 9/22* (2006.01)
  *H02K 9/20* (2006.01)
  *H02K 1/20* (2006.01)

(52) U.S. Cl.
  CPC ............. *H02K 9/22* (2013.01); *B63H 23/24* (2013.01); *B63H 2005/1258* (2013.01)

(58) Field of Classification Search
  CPC ... H02K 5/20; H02K 9/10; H02K 1/20; B60L 11/00; B60L 11/02; B60L 11/16; B60L 11/18
  USPC ........................................................ 440/6, 53
  See application file for complete search history.

(56) References Cited

U.S. PATENT DOCUMENTS

| | | | |
|---|---|---|---|
| 6,485,339 | B1 | 11/2002 | Hartig et al. |
| 6,676,463 | B2 | 1/2004 | Le Bert et al. |
| 6,685,516 | B2 | 2/2004 | Tsuboguchi |
| 7,186,156 | B2 * | 3/2007 | Le Flem ............... B63H 5/125 440/6 |
| 7,198,528 | B2 | 4/2007 | Varis |
| 7,371,134 | B2 | 5/2008 | Winn |
| 7,448,929 | B2 | 11/2008 | Huber et al. |
| 2003/0148676 | A1 | 8/2003 | Lonngren |
| 2004/0175998 | A1 | 9/2004 | Lonngren |
| 2007/0117478 | A1 | 5/2007 | Frauenhofer et al. |
| 2014/0292122 | A1 * | 10/2014 | Pal ........................... H02K 5/20 310/59 |
| 2015/0015105 | A1 | 1/2015 | Sakkinen |
| 2017/0081007 | A1 * | 3/2017 | Kosso ................... B63H 21/17 |

FOREIGN PATENT DOCUMENTS

| | | |
|---|---|---|
| EP | 2 098 447 A1 | 9/2009 |
| EP | 2 420 443 A1 | 2/2012 |
| EP | 2 824 028 A1 | 1/2015 |
| JP | 2005-186748 A | 7/2005 |
| WO | 31/81170 A1 | 11/2001 |
| WO | 2004/101356 A1 | 11/2004 |
| WO | 2015/185302 A1 | 12/2015 |

OTHER PUBLICATIONS

Written Opinion of the International Searching Authority issued in International Application No. PCT/EP2015/059680 dated Sep. 1, 2015.

International Search Report issued in International Application No. PCT/EP2015/059662 dated Dec. 8, 2015.

Written Opinion of the International Searching Authority issued in International Application No. PCT/EP2015/059662 dated Dec. 8, 2015.

* cited by examiner

POD PROPULSION DEVICE AND A METHOD FOR COOLING SUCH

CROSS-REFERENCE TO RELATED APPLICATIONS

This application claims priority to PCT/EP2015/059680, filed May 4, 2015, entitled "POD PROPULSION DEVICE AND A METHOD FOR COOLING SUCH," which claims priority to Swedish Patent Application No. 1450675-2, filed Jun. 3, 2014, all of which are incorporated by reference in their entirety.

FIELD OF INVENTION

The present invention relates to a method for pod propulsion device including a motor casing and a strut, which strut is connected at a lower part thereof to the motor casing and is arranged to be connected at an upper part thereof to a hull of a ship, which motor casing includes a housing enclosing an electric motor with a stator and a rotor, and which housing has an upper portion, regarding the cooling of the stator of the pod propulsion device.

In the present application terms as "upper" and "lower" refers to the normal position of a pod propulsion device when mounted onto a ship. Terms like "axial" refers to the axis of the electric motor in the motor casing. Ship is to be understood as any floating vessel.

BACKGROUND OF INVENTION

A pod propulsion device using an electric motor for driving the propeller shaft generates a substantial amount of heat. Since the stator of the motor normally is in contact with the housing of the motor casing a large portion of the heat is rejected through the housing to the surrounding sea water. However, the upper side of the motor casing housing does not face the water but is exposed to the interior of the strut. In this area the direct cooling to the sea water thus will not occur. Due to the low efficiency of cooling in this area a hot spot is developed. One way to coop with this is to use a motor that is larger than actually needed in order to avoid overheating within the hot spot. This is of course not a cost effective solution.

Attempts have also been made to provide specific cooling arrangements in this area. One example is disclosed in U.S. Pat. No. 6,485,339 relating to a pod with an electric motor driving a propulsion shaft. The pod is provided with means for increasing the transfer of the heat generated by the motor. For this reason there are cooling ducts arranged at various locations in the motor casing and the strut. These ducts include ducts arranged at the upper side of the motor stator, facing the strut, i.e. the region where the pod body is not in direct contact with the surrounding water. By cooling medium in these ducts such as air or water heat is rejected away from this region.

U.S. Pat. No. 7,448,929 discloses another example of providing a cooling medium such as water to flow outside the wall of the motor casing in the region where it faces the strut.

U.S. Pat. No. 7,198,528 discloses a motor casing where the motor casing is designed such that the surrounding sea water reaches all around the housing.

Further examples of cooling systems for pod are disclosed in U.S. Pat. No. 6,312,298, U.S. Pat. No. 5,403,216, U.S. Pat. No. 6,676,463, U.S. Pat. No. 6,685,516, U.S. Pat. No. 7,371,134, EP 1010614 and EP 2098447.

The provision of special cooling ducts for cooling the hot spot is circumstantial and space consuming, in particular since cooling ducts also are required to cool other parts of the electric motor.

SUMMARY OF INVENTION

It is an object of the invention to achieve improved cooling of the pod propulsion device to minimize the drawbacks related to prior art in this field.

This object is according to the first aspect of the invention attained in that a pod propulsion device of the kind specified in the preamble of claim 1 includes the specific measures specified in the characterizing portion of the claim.

The pod propulsion device thus is provided with a cooling system that is arranged to periodically change direction of the cooling flow.

According to a further aspect there may be arranged a stationary heat conducting means, in contact with the upper portion of the housing of the motor casing, to conductively connect a portion of the motor to at least one outer wall of the strut.

Stationary is to be understood as maintained in the region implicitly defined by the claim. Stationary, however, does not necessarily mean that the heat conducting means is not movable within this region. And stationary does not necessarily mean that the heat conducting means is a solid, it may be a liquid and/or a gaseous medium at least partly.

It is also to be understood that the pod propulsion device according to the invention may also include one or more other cooling systems, connected to a heat exchanger in the ship.

The invented pod propulsion device provides an efficient cooling of the pod propulsion device such that the temperature gradient circumferentially around the housing of the motor casing will be low. The means used is very simple to install and reliable for its function. Furthermore, the cooling method of the invention occupies less space in the strut.

The above mentioned preferred embodiments of the invented pod propulsion device are specified in the claims depending from claim 1. It is to be understood that further embodiments of the invention may be constituted by any possible combination of features specified in the embodiments above present in the description of examples below.

The invention also relates to a ship being provided with a pod propulsion device according to the invention.

DESCRIPTION OF EXAMPLES

Figure 1:
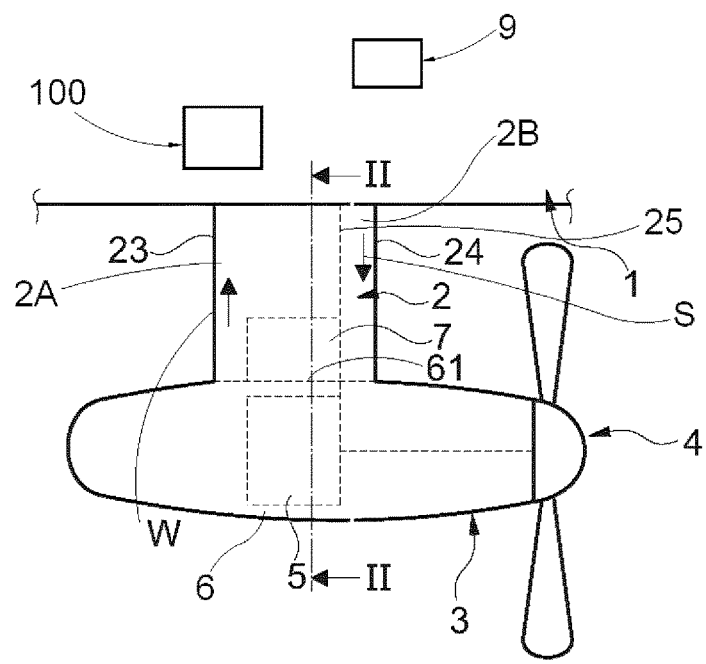
FIG. 1 is a schematic side view of a pod propulsion device of the kind to which the invention relates.

FIG. 1 illustrates a pod propulsion device according to the present invention. The device comprises a motor casing 3 with a propeller 4 at its front end driven by an electric motor 5. The motor 5 is encapsulated in a motor housing 6 in contact with the circumferential of the motor 5, which motor housing 6 may be an integral part of the casing 3 or a separate part. The motor casing 3 is hanging in a strut 2 through which it is connected to the hull 1 of a ship such that the motor casing is located in water. The propeller 4 drives the ship. The pod propulsion device may be rotatable around a vertical axis (or at least substantially vertical) through the strut 2 for steering the ship. It is to be understood that a propeller may be present also at the rear end of the motor casing 3. The basic principle for pod propulsion of a ship is supposed to be generally known and therefore does not require a detailed description.

The strut 2 has outer walls enclosing various equipment in the strut 2 necessary for the operation of the motor casing 3. In FIG. 1 the end walls 23, 24 are visible, and in FIG. 3 the side walls 21, 22 are visible. The side walls generally extend along the axis of the motor 5 substantially in NACA shape.

At operation the electric motor generates heat that has to be rejected. A part of the heat may be rejected by forced air flow through the motor, whereby the air is supplied S and withdrawn W by ducts 2A, 2B through the strut 2, which ducts 2A, 2B are divided by means of a vertical partitioning wall 25 in the strut 2. Heat, in particular from the stator of the motor, is also rejected through the housing 6 of the motor casing 3. A major part thereof is taken up by the water surrounding the motor casing 3.

According to the invention, the forced air flow may be periodically redirected by means of the control unit 9, i.e. after a time period t the control unit 9 will redirect the forced air flow, whereby the direction of flow through the strut 2 and the machine casing 3 is changed to instead have the supply S move in the opposite duct 2A in the strut 2, i.e. the duct 2A where before air was withdrawn W. This may be achieved either by changing direction of the fan for the forced air flow, or by having different ducts providing different directions of flow, and/or by means of damper device/s variable/movable guide vanes.

Figure 2:
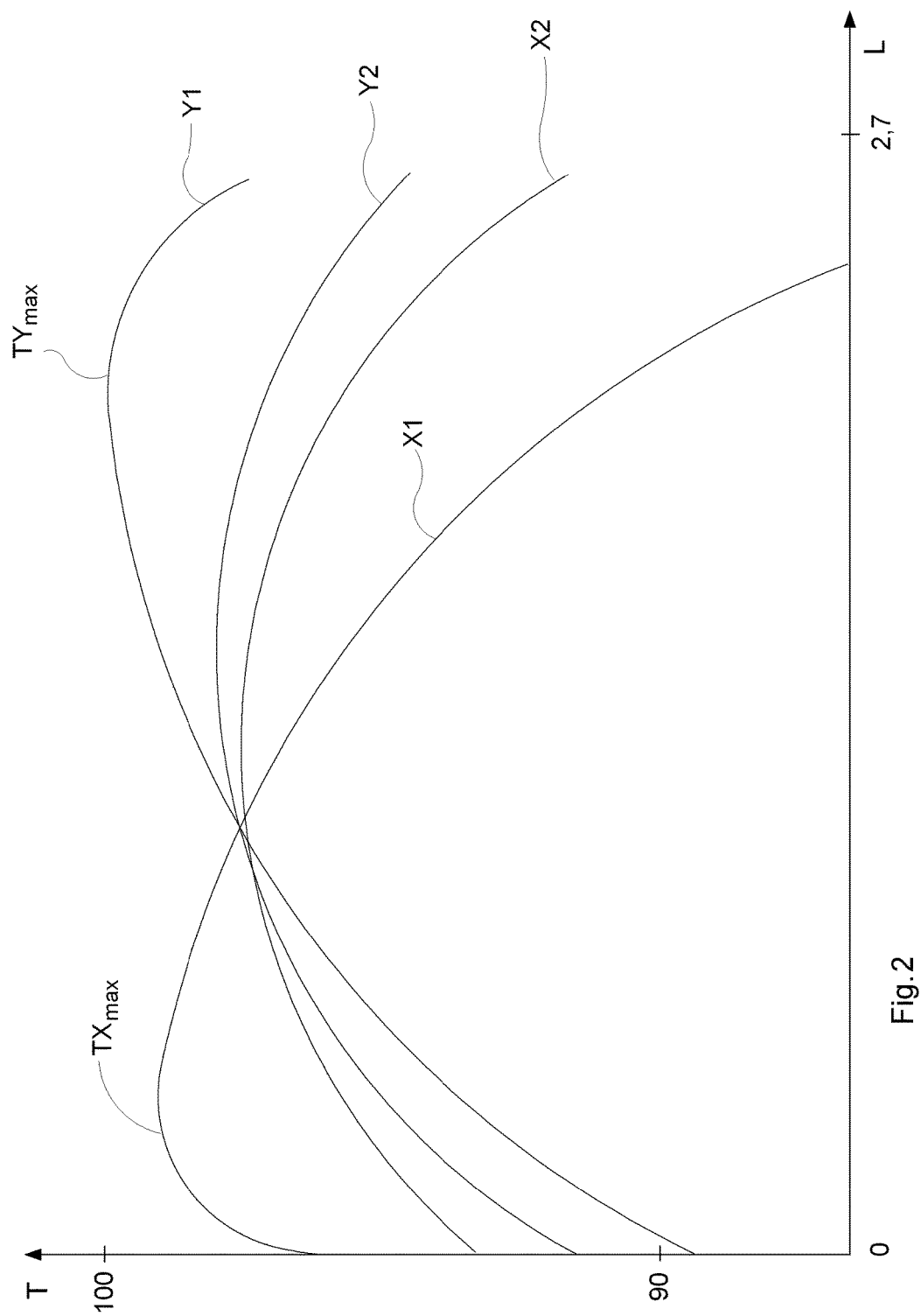
FIG. 2 shows a graph presenting advantages according to the invention when operating the cooling of a POD unit.

In FIG. 2 there is shown a chart presenting the advantages with such a method, i.e. that the temperature T may be kept at a lower level if a change of flow direction is performed periodically, e.g. t is between 1 to 15 minutes. The chart presents a number of temperature graphs depicting the temperature at different locations of a machine casing 3 having a length of about 2.7 m, wherein the X-axis represent different locations along the machine casing from one end to the other and the Y-axis the temperature in relative terms, where a maximum temperature represents 100. Each graph presents the temperature at each location within the casing with different t. The two graphs X1, Y1 showing the highest temperatures show test with t=0, i.e. no change of direction, wherein the highest temperature is obtained within the machine casing 3, adjacent the withdrawal duct. When using the first duct 2B, see X1, as supply S a top temperature $TX_{max}$ was obtained and with the second duct 2A as supply, see Y1, a top temperature of $TY_{max}$ was obtained. The tests shown in the chart suggest that t optimally is different depending on which duct 2A, 2B is used as supply S. Hence when using the first duct 2B as supply S the time, tx should be around 4-6 minutes (X2=5 min), whereas when using the second duct 2A as supply S the time TY should be around 8-10 minutes (Y2=9 min). Hence, mostly it may be optimal to have TX≠TY. When using TX=5 min (X2) and TY=9 min (Y2) a reduction of the top temperature of about 2% was achieved, which as is evident for the skilled person may make a big difference regarding performance/life time of some machine parts, e.g. the insulation in the electrical engine. One important advantage when using this modification is therefore that a higher power level may be used for the motor, which may lead to the advantage that a smaller motor may be used, which positively influences cost and weight and hydrodynamic-performance, i.e. unit efficiency.

Figure 3:
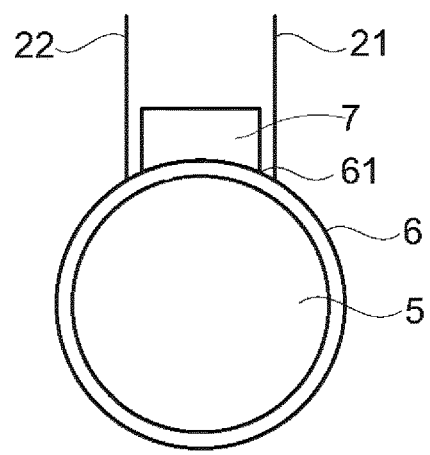
FIG. 3 is a schematic section through line II-II in FIG. 1, including an optional additional feature that may further improve cooling efficiency.

However, as can be seen in FIG. 3, the motor housing 6 has a surface 61 that is not exposed to the surrounding water but faces the interior of the strut 2, in order to reliably attach the motor 5 it is normally desired to have the motor housing 6 at least partly (axially) totally (radially) enclosing the motor 5, as indicated in FIG. 3. The surface 61 is limited by the side walls 21-22 of the strut 2, but normally do not extend all the way to the aft and front walls 23, 24 to leave gaps for the air ducts 2A, 2a In order to reject heat generated in that part of the stator 51 of the motor 5 that contacts the housing 6 at this surface 61 there is according to the invention provided a heat conducting means 7 which is in contact with the surface 61 of the housing 6 and with the side walls 21, 22 of the strut 2. The heat thus is transferred to these side walls 21, 22, which walls are cooled by the surrounding water.

In FIGS. 1 and 3 such a stationary heat conducting means 7 is represented by a box in order to simplify the presentation.

Figure 4:
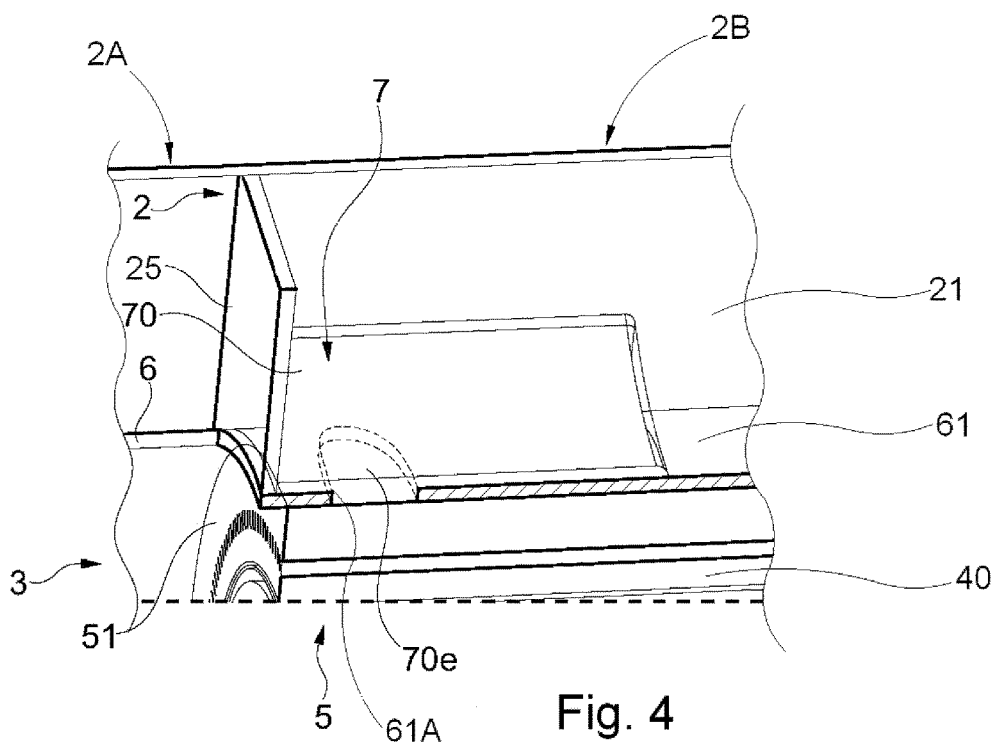
FIG. 4 is a perspective view of a detailed embodiment of the optional additional features depicted in FIG. 3.

FIG. 4 in a perspective view depicts one end of the motor 5 and the adjacent part of the strut 2. The motor is vertically cut through its diameter, thus showing only a part of one half of the motor 5, with its rotor 40 and stator 51. In this example the heat conducting means is a body 70 of a heat conductive metal such as copper, aluminium or steel. The body 70 may extend in the axial direction along the motor 5. In the shown embodiment it extends about half the length of the motor 5 and is located at one of the ends thereof, however it is evident for the skilled person that the extension of the body may be varied in order to adapt to different needs. The lower part of the body 70 contacts the surface 61 of the housing 6, which surface faces the interior of the strut 2. The body also contacts one of the side walls 21 of the strut 2. The stator 51 is in contact with the housing 6. Thereby heat is transferred from the stator 51 to the surface 61 and from this through the body 70 to the side wall 21, which is cooled by the water on its outside. According to a modification (not shown) the body 70 may extend past the partitioning wall 25 and into contact with the front wall 24, whereby passages/holes (not shown) are arranged in the body to enable through flow of cooling air. Of course the same principle may be used at the aft side, i.e. an extended body 70 with passages/holes. In a preferred embodiment, as shown in FIG. 4, there is one or more recess/es 61A formed in the outer periphery of the casing 61 and corresponding protrusions 70e in the body, whereby an enhanced heat transfer is achieved, due to direct contact with the stator 51. In an alternate embodiment the intermediate part of the motor housing 6 with the intermediate surface 61 may totally be eliminated to establish direct contact between the body 70 and the stator 51.

Figure 5:
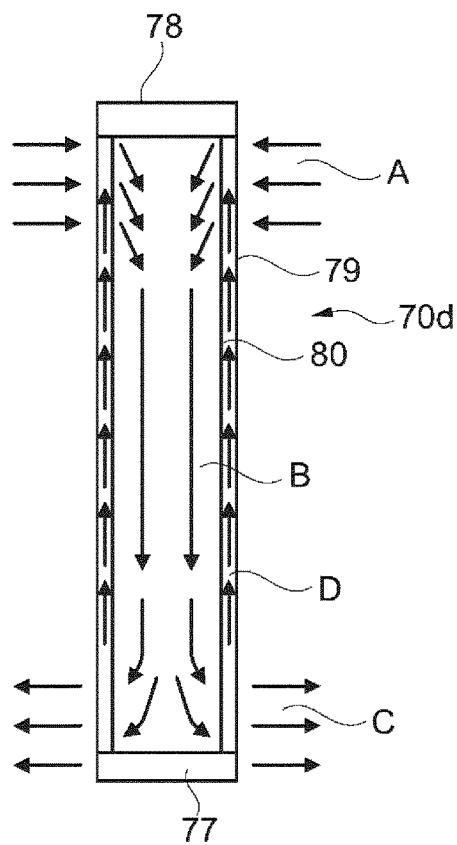
FIG. 5 is a sectional view through a detail according to an embodiment depicted in FIG. 3.

FIG. 5 illustrates a heat pipe 70d that in one example is used to connect the surface 61 of the housing 6 to a side wall 21 of the strut. A first end 78 of the heat pipe is conductively connected to the surface 61 of the casing 6 or to a body conductively connected thereto. A second end 77 of the heat pipe 70d is connected to the wall 21 of the strut or to a body conductively attached thereto. The heat pipe has an outer wall 79 and an inner wall 80 such that a passage is formed between the walls. This passage communicates with the ends of the heat pipe. A central passage also communicates with the ends of the heat pipe. A medium is present inside the heat pipe, which medium is selected to have a condensation temperature at a level such that the medium will have a liquid phase and a gaseous phase within the heat pipe.

In the passage between the walls 79 and 80 there is provided a capillary device such as wicks.

The medium is heated at its first end 78 by the heat A from the surface 61 of the housing 6. Thereby the medium evaporates, and the vapour B flows through the central passage to the opposite end 77 where it is cooled C by the end wall 21 of the strut such that it condenses. The condensed medium is by capillary force transported D in the outer passage back to the first end 78 where it is again evaporated for further circulation. Due to the capillary force the function does not rely on gravity. Therefore the orientation can be freely selected and may be vertical as well as horizontal.

In an alternative example a capillary device is not present in the outer passage. This implies limitations to the orientation since the circulation in that case is due to gravity. In such an example the first end 78 has to be the lowermost end. Further it is evident for the skilled person that also with heat conductive rods (i.e. not hollow pipes) the basic functionality according to the invention is achieved.

It is to be understood that the same arrangement may be provided for the other half of the motor and being connected to the opposite side wall 22 (not visible in FIG. 4). The body 70 at each side may be connected at the vertical diametrical plane of the motor 5, thereby forming a common unit.

The body 70 in the figure preferably extends all the way to the vertical diameter of the motor 5. It may alternatively end at a distance from the vertical diameter.

It is evident that the invention is not limited by the examples described above but that many variations may be performed by the skilled person to obtain the described function, within the ambit of the claims.

Further, it is evident that some aspects described above, may be protected separately by separate divisional applications.

The invention claimed is:

1. A method for cooling a pod propulsion device of a ship, comprising:
   supplying a forced cooling air flow to an electric motor via one of a front duct and an aft duct of the pod propulsion device while withdrawing the forced cooling air flow from the electric motor via the other of the front duct and the aft duct; wherein the pod propulsion device comprises a strut including a lower part connected to a motor casing and an upper part connected to a hull of the ship, and wherein the motor casing includes a motor housing enclosing the electric motor, and the electric motor comprises a stator and a rotor; and
   controlling the forced cooling air flow to periodically shift direction of the forced cooling air flow so that during a first limited time period the forced cooling air flow is supplied to the electric motor via the aft duct of the pod propulsion device and is withdrawn from the electric motor via the front duct of the pod propulsion device, and thereafter during a second limited time period the forced cooling air flow is supplied to the electric motor via the front duct of the pod propulsion device and is withdrawn from the electric motor via the aft duct of the pod propulsion device.

2. A method according to claim 1, wherein each of the first limited time period and the second limited time period is between 1 minute and 15 minutes.

3. A method according to claim 1, wherein the first limited time period is not equal to the second limited time period.

4. A method according to claim 1, further comprising the step of additionally cooling the pod propulsion device by withdrawing heat generated by the electric motor through a heat conducting body in contact with an upper portion of the motor housing, wherein the heat conducting body comprises a heat conductive connection between the upper portion of the motor housing and at least one outer wall of the strut.

5. A method according to claim 4, wherein the upper portion of the motor housing comprises a surface of the motor housing that faces an interior of the strut and that is not in direct heat conductive contact with water surrounding the pod propulsion device, and wherein the at least one outer wall of the strut is in direct heat conductive contact with the surrounding water.

6. A system for cooling a pod propulsion device, comprising:
   a strut comprising an upper part connected to a hull of a ship, and a lower part connected to a motor casing;
   an electric motor comprising a stator and a rotor;
   the motor casing, including a motor housing enclosing the electric motor;
   an air flow arrangement, comprising a front duct and an aft duct defined within the pod propulsion device, wherein the front duct is opposite the aft duct in the strut, configured to supply a forced cooling air flow to the electric motor via one of the front duct and the aft duct while withdrawing the forced cooling air flow from the electric motor via the other of the front duct and the aft duct; and
   a control unit configured to periodically shift direction of the forced cooling air flow so that during a first limited time period the forced cooling air flow is supplied to the electric motor via the aft duct of the pod propulsion device and is withdrawn from the electric motor via the front duct of the pod propulsion device, and thereafter during a second limited time period the forced cooling air flow is supplied to the electric motor via the front duct of the pod propulsion device and is withdrawn from the electric motor via the aft duct of the pod propulsion device.

7. A system according to claim 6, wherein each of the first limited time period and the second limited time period is between 1 minute and 15 minutes.

8. A method according to claim 6, wherein the first limited time period is not equal to the second limited time period.

9. A system according to claim 6, further comprising a heat conducting body in contact with an upper portion of the motor housing, wherein the heat conducting body comprises a heat conductive connection between the upper portion of the motor housing and at least one outer wall of the strut.

10. A system according to claim 9, wherein the upper portion of the motor housing comprises a surface of the motor housing that faces an interior of the strut and that is not in direct heat conductive contact with water surrounding the pod propulsion device, and wherein the at least one outer wall of the strut is in direct heat conductive contact with the surrounding water.

11. A system according to claim 9, wherein the heat conducting body includes a solid conductive material conductively connecting the upper portion of the motor housing to said at least outer wall.

12. A system according to claim 9, wherein the heat conducting body conducts heat from the upper portion of the motor housing along an entire axial length of the electric motor.

13. A system according to claim 9, wherein the heat conducting body conducts heat solely from one or more parts of an axial extent of the electric motor, such that one or more other part of the axial extent of the electric motor is not in direct contact with the heat conducting body.

14. A system according to claim 6, further comprising a heat conducting body in contact with an upper portion of the stator, wherein the heat conducting body comprises a heat conductive connection between the upper portion of the stator and at least one outer wall of the strut.

15. A system according to claim 14, wherein the heat conducting body conducts heat solely from one or more parts of an axial extent of the electric motor, such that one or more other part of the axial extent of the electric motor is not in direct contact with the heat conducting body.

16. A ship, comprising:
   a hull;
   a strut comprising an upper part connected to the hull of the ship, and a lower part connected to a motor casing;
   an electric motor comprising a stator and a rotor;
   the motor casing, including a motor housing enclosing the electric motor;
   an air flow arrangement, comprising a front duct and an aft duct defined within the pod propulsion device, wherein the front duct is opposite the aft duct in the strut, configured to supply a forced cooling air flow to the electric motor via one of the front duct and the aft duct while withdrawing the forced cooling air flow from the electric motor via the other of the front duct and the aft duct; and
   a control unit configured to periodically shift direction of the forced cooling air flow so that during a first limited time period the forced cooling air flow is supplied to the electric motor via the aft duct of the pod propulsion device and is withdrawn from the electric motor via the front duct of the pod propulsion device, and thereafter during a second limited time period the forced cooling air flow is supplied to the electric motor via the front duct of the pod propulsion device and is withdrawn from the electric motor via the aft duct of the pod propulsion device.

* * * * *